Sept. 17, 1935. F. KRONENBERGER 2,014,851
FIBER CUSHION HOLDER FOR EGGS
Filed Nov. 1, 1932
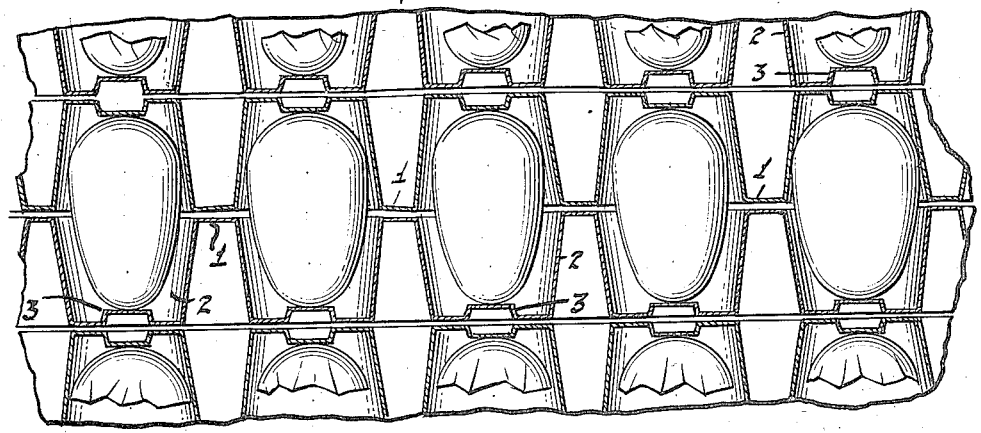
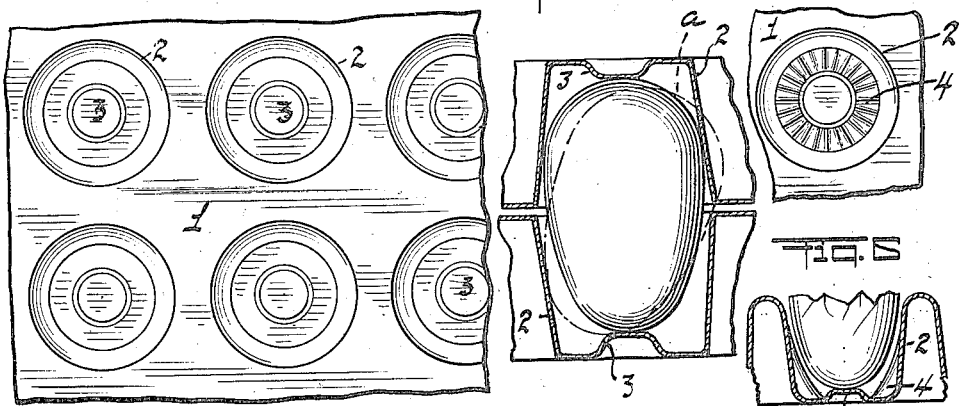
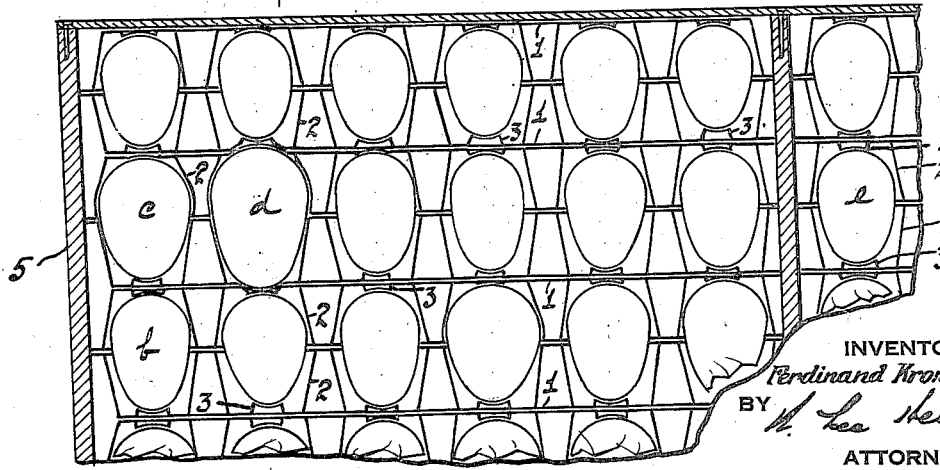
INVENTOR-
Ferdinand Kronenberger,
BY
ATTORNEY- Patented Sept. 17, 1935

2,014,851

UNITED STATES PATENT OFFICE 2,014,851

FIBER CUSHION HOLDER FOR EGGS

Ferdinand Kronenberger, Brooklyn, N. Y.

Application November 1, 1932, Serial No. 640,597

1 Claim. (Cl. 217—26.5)

This improvement relates to a fiber cushion holder for eggs for use in boxes commonly employed for packing, shipping and storage, and particularly, the wooden wholesale egg boxes of commerce.

The object of the invention is to provide elastic cushion means for holding eggs of various heights and widths in such manner that the eggs are held under pressure along the line of their longitudinal axes by cushion members carried at the ends of two holders having cup-like pockets, the pocket of one holder lying opposite a second holder and the two enclosing an egg in such manner that reversely directed cushion projections grip the eggs at the ends. When successive layers of eggs are placed in the box, the cover member is pressed down and the eggs will deform their opposed cushion projections in ratio depending upon, in each case, the length of the egg. Also the side wall of each cup is elastic to permit deformation by eggs of abnormal width, although the construction is preferably such that eggs of normal or lesser width are held by the cushion members spaced from the side wall of the cup.

The invention will be described with reference to the accompanying drawing, in which Fig. 1 is a vertical section through a plurality of holders in assembled position showing eggs disposed within a plurality of the cups and engaging the cushion projections.

Fig. 2 is a fragmentary plan view of one of the cushion holders.

Fig. 3 is a fragmentary view in sectional elevation of an egg box showing a plurality of cushion holders in position and eggs of various sizes disposed therein after the cover member of the box has been pressed downwardly and nailed in position.

Fig. 4 is a fragmentary sectional elevation of two of the cushion members showing in dotted lines the position of an egg placed carelessly in the bottom cushion holder, and in full lines the egg when the top cushion holder has automatically moved same into proper position, by its mere application thereto and downward movement thereof.

Fig. 5 is a fragmentary top plan view of one of the cushion holders showing corrugated formation of the side wall of the cup at its lower end.

Fig. 6 is a transverse section then of showing the lower portion of an egg in position within the cup.

In the drawing, with particular reference to Figs. 1, 2 and 4, I have shown a fiber cushion holder comprising a horizontal sheet 1 of fiber formed with depressed cups 2. At the base of each cup is an upwardly projecting cushion member 3. I prefer that each cup be somewhat greater in diameter than the major diameter of a standard size egg. In practice, the major depth of each cup will be 1⅛ inch so that the longitudinal area of each cup corresponding to the longitudinal axis of an egg will be 2¼ inch.

It will be noted that the cups are preferably tapered so that the end of lesser diameter is the bottom of the cup although such formation is not essential.

Each cushion holder may be of standard size to occupy the area of one-half of a commercial egg box, which, in practice, will contain layers of superposed eggs, each layer comprising thirty-six eggs. That is to say, each cushion holder will comprise six rows of six cups each.

When the eggs are placed in the cups of a lower cushion holder a holder of exactly the same formation is placed in inverted position over the tops of the eggs. If any of the eggs have been carelessly placed in the cups of the lower cushion holder, for instance, in the position shown in dotted lines $a$, Fig. 4, the tapered wall of the inverted upper cushion holder in its downward movement into position will turn the egg to the full line position of Fig. 4, such movement being aided by the fact that the points of the eggs rest upon the restricted area of the cushion projection 3.

If desired, the wall of each cup at the base thereof and immediately surrounding the cushion projection 3 may be corrugated as at 4, Figs. 5 and 6. Such corrugations not only provide added cushioning support to certain side areas of the egg, but, when the egg box is filled, the cover pressed down and nailed, the movement of an upper cushion holder toward a lower cushion holder, will bring the corrugations of the respective holders into mutual contact and projections of one corrugation will enter depressions of an engaging corrugated cushion holder section which will resist relative plane movement of the cushion holders, the plane being that indicated at 1, Fig. 2.

In Fig. 3, I have shown a wooden egg box now in commercial use containing a plurality of superposed layers of eggs, each layer being held in the cups 2 of a lower cushion holder and then the corresponding cups 2 of an upper cushion holder, the ends of each egg engaging a reversely directed cushion projection 3 of the said holders. In the said drawing, the exaggerated forms of different size eggs are shown in order to illustrate the action of my improved cushion holder when a plurality of the latter are employed to cushion a plurality of superposed layers of eggs. For example, the egg *b* is or normal size spaced from the walls of the cups, the cushion projections being only slightly deformed in their clamping but cushion holding effect upon the egg at its ends. Egg *c* is of abnormal width but normal length and the walls of the cup 2 encasing the upper portion of the egg are laterally deformed. The egg *d* is not only of abnormal width but of abnormal length. The wall of the cup 2 encasing the upper portion of the egg *d* are laterally deformed and at the point, or lower end of the egg, the cushion projection 3 has been pressed downwardly and then slightly reversed in direction in its accommodation of the egg; this being true also of the upper cushion projection which has been placed into the projection of the cushion holder cup immediately above it. The egg *e* is a small egg, being not only spaced from the walls of the encasing cushion holder pockets, but being engaged lightly by the cushion projections 3.

Inasmuch as the cups are separated by horizontal sheet 1 providing a corresponding horizontal wall extending intermediate the cups, the wall of a lower cushion holder will be engaged by the wall of an upper cushion holder when the eggs are placed in position within the cushion holders of a box, the cover pressed down into position and nailed in place. Therefore, crushing of the eggs by abnormal movement of opposed cushion holders toward each other in packing the box and nailing down the cover is prevented.

The cushion holder above described may conveniently be made by blowing paper pulp upon a form, or, by any other suitable method.

It will be understood that various modifications may be made in the form and arrangement of the elements illustrated in the drawing, without departing from the spirit of the invention.

What I claim and desire to secure by Letters Patent, is as follows:—

A fiber cushion holder for eggs comprising two like units, each having a wall portion merging into a plurality of rows of conical cup-like members, each member having a horizontal base wall and centrally thereof a semi-spherical protuberance substantially less in diameter than the internal diameter of said wall and projecting toward the opening of the cup, said protuberance adapted to receive the end of an egg, the depth of the cup to the protuberance being substantially half the length of the egg, the two cushion holder units being superposed in such manner that each egg held in a cup is supported at one end directly upon the protuberance of a lower holder and is balanced and cushioned at its opposite end by direct contact with the reversely extending protuberance of the reversed upper cushion holder.

FERDINAND KRONENBERGER.